H. GINDELE.
PHOTOGRAPHIC FILM CARTRIDGE.
APPLICATION FILED AUG. 5, 1916.
1,240,335.
Patented Sept. 18, 1917.
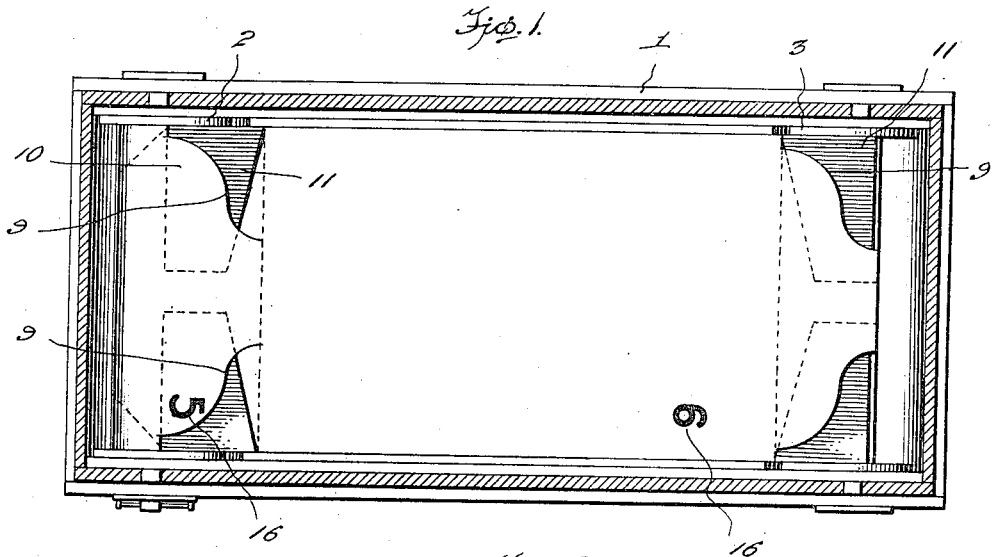
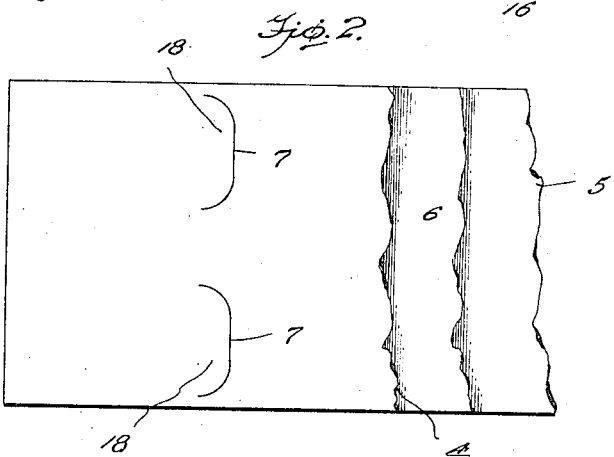
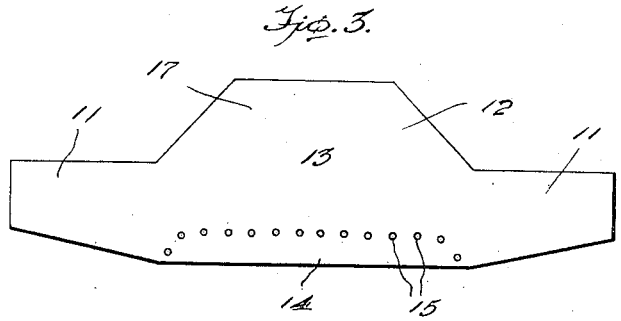

UNITED STATES PATENT OFFICE.

HARRISON GINDELE, OF CINCINNATI, OHIO.

PHOTOGRAPHIC-FILM CARTRIDGE.

1,240,335.  Specification of Letters Patent.  Patented Sept. 18, 1917.

Application filed August 5, 1916. Serial No. 113,260.

*To all whom it may concern:*

Be it known that I, HARRISON GINDELE, a citizen of the United States, residing at Cincinnati, in the county of Hamilton and State of Ohio, have invented certain new and useful Improvements in Photographic-Film Cartridges; and I do hereby declare the following to be a full, clear, and exact description of the invention, such as will enable others skilled in the art to which it appertains to make and use the same.

This invention is a photographic film cartridge for daylight loading cameras wherein a strip of sensitized film is protected by a covering strip containing means to indicate separate exposures and points of severance into separate exposures.

Heretofore, it has been found difficult to remove a particular exposed portion from a film strip for development and thereafter permit of future exposures on the remaining portion of the film. A purpose of this invention is to permit of the removal of one or more exposures from the film cartridge without the necessity of removing an unexposed portion of the film from the cartridge, whereby the remaining portion of the film may be treated by machine development or tank development, or may be developed in the strip by hand method as though no portion of the film had been removed from the film strip. A further object of the invention is to provide a film retaining device which coöperates with the backing strip in such manner that the retaining device will not be injured or removed from its adjusted position on the film or backing strip during its passage through the camera. In some types of cameras, a removable back is employed which contains an alining plate, and this plate is liable to engage protruding portions of the backing strip of a film to retard the movement of the film strip through the camera by engagement with such protruding portions.

Broadly stated, the invention comprises a covering strip having slits of novel design formed therein intermediate its ends, associated with a film engaging element which is independent of the sensitized film and its covering strip, the film engaging element including retaining means which are adapted to be loosely positioned in the slits of the covering strip when the film cartridge is prepared for use in a camera. This film engaging element is carried by the backing strip while the film is being exposed and fed through the camera and may thereafter be secured to the sensitized film and its covering strip when a section of the sensitized film is removed from the film strip, the novel form of slits in the covering strip being such that they house and protect the retaining means of the film engaging element from being disengaged by the alining plates of the camera backs.

Further objects and advantages of the invention will become apparent from the following detail description taken in connection with the accompanying drawings and as pointed out in the appended claims.

While an embodiment of the invention is shown in the drawings, it is to be understood that the disclosure is for the purpose of illustration only, and not as defining the limits of the invention.

In the drawings:—

Figure 1 is a plan view, parts being in section, illustrating a film cartridge embodying the invention mounted within a camera.

Fig. 2 is a plan view disclosing a portion of a film.

Fig. 3 is a detail view of one of the film engaging elements.

Referring more particularly to the embodiment of the invention disclosed in the accompanying drawings, a camera is indicated at 1 and may be of any preferred type. The film spools are indicated at 2 and 3 and are positioned at each end of the camera in the usual manner.

The film cartridge may be of any preferred type for daylight loading cameras, wherein the sensitized film 4 is protected by a strip of covering material indicated at 5. An autographic sheet is indicated at 6.

The sensitized film 4 is preferably secured to the covering strip 5 in any suitable manner, usually at that end adjacent to the winding spool 2 to facilitate the feeding of the film through the camera with the covering strip.

The film 4 is preferably provided with slits indicated at 7 as extending transversely across the film. The slits may be made in any suitable manner, as by die-cutting, to facilitate the severance of the film at the division line between exposures, leaving only a small portion indicated at 8 where the film is not severed. The slits 7 may be arcuate in form as shown in Fig. 2, and these slits are so positioned that they divide the exposure fields on which the negatives are formed by exposure and development.

The covering strip 5 may be provided with slits 9 which may be arranged to substantially register with the slits 7 of the film strip 4. The covering strip, it will be understood, is of greater length than the sensitized film strip, as is usual in film cartridges of this character. The slits 9 of the covering strip are arranged at predetermined intervals throughout the length of the covering strip 5 and these slits may be of any preferred form extending from a point near the outer edge of the covering strip rearwardly toward its longitudinal center. The slit is shown in the form of an ogee curve, although it is obvious that it may take other configuration. By this form of slit 9, the material at 10 of the covering strip serves to protect wings 11 of a film engaging element 12 which coöperates with the film strip and the covering strip. The film engaging element may be of the form shown in Fig. 3 having the central body portion 13 and a detachable portion 14 having a line of severance indicated at 15. This detachable portion 14 is designed to be passed through the slits 7 of the film strip at each exposure section, it being understood that a film engaging element may be employed at each exposure section, where the portion 14 of the element 12 may be secured to the film strip. If desired, the portion 14 may be gummed to adhere to the sensitized face of the film strip 4 when passed through the slits at 7. The wings 11 of the film engaging element are also provided with an adhesive substance upon one surface thereof so that the wings 11 may be secured to the outer face of the backing strip 5 when it is desired to retain the film section into contact with the backing strip.

The covering strip 5 may have the indicating marks 16 to represent the film exposures placed thereon in the usual manner, and at the end of the film, the wings 11 may be employed to connect the free end of the sensitized film to the backing strip for machine development in lieu of the ordinary loose adhesive slip which now accompanies such film and which requires that the operator shall unroll the film until the loose slip and the sensitized film are exposed to view. In this invention, wings 11 may be removed from the slits 9 of the covering strip 5, and their under gummed face may be moistened and secured to the outer face of the covering strip 5, it being understood that the film engaging element 13 is connected to the film by means of its adhesive portion 14 connecting with the slitted portion 18 of the sensitized film.

Assuming that an exposure has been made on an intermediate section of the film strip, for example the second exposure, and the remainder of the strip has not been exposed, the photographer may take the camera to a dark room, loosen the spool 2, or unroll the film therefrom until he exposes the end of the film strip, whereupon he may remove the exposed section or exposures 1 and 2 from the sensitized strip and secure the remaining exposures to the backing strip 5 by means of the adhesive wings 11. If the autographic strip 6 is employed, the gummed surface of the central tab 17 may be secured to the autographic strip 6 instead of the under face of the covering strip 5. It is preferred to secure the removable film engaging element to the film when the cartridge is prepared at the factory, thereby relieving the photographer of the necessity of performing the operation.

After the film engaging element 13 shall have been thus secured to the film, or to the autographic strip, a sensitized film section may be torn from the covering strip 5 by means of the perforations 15 or cut or torn on the lines 8 of the film. Thereafter, the spool 2 may be reinserted into the camera and the remaining unexposed portion of the film may be exposed in the usual manner and such film portion as remains on the roll holder may be thereafter developed by any of the usual methods.

It is obvious that various changes may be made in the formation of the slits of the film strip and backing strip or in the formation of the film engaging element than that herein shown and described, and the right is hereby reserved to make such changes and alterations as fairly fall within the scope of the appended claims.

Having thus described my invention, what I claim as new is:—

1. A film cartridge embodying a covering strip, a photographic film carried thereby, said covering strip being slitted from a point near its outer edge toward its longitudinal center, and a film engaging element independent of the film and covering strip and having means to be positioned loosely in the slit of the covering strip and adapted to be secured to the film and covering strip.

2. A film cartridge embodying a covering strip, a photographic film carried thereby, said covering strip being provided with a curved slit from a point near its outer edge and extending rearwardly toward its longitudinal center, and a film engaging element independent of the film and covering strip having retaining means adapted to be positioned loosely in the slit of the covering strip, said film engaging element having means whereby the same may be secured to the film and covering strip.

3. A film cartridge embodying a covering strip, a photographic film carried thereby, said covering strip being provided with a slit in the form of an ogee curve extending from a point near its outer edge rearwardly toward its longitudinal center, and a film engaging element independent of the film and covering strip having means to be positioned within the slit of the covering strip to be protected thereby during the passage of the film through a camera, said film engaging element being provided also with means whereby said element may be secured to the film and its covering strip.

4. A film cartridge embodying a covering strip, provided with a plurality of arcuate slits for each exposure to be represented on the photographic film, a photographic film carried by the covering strip having a slit positioned substantially between each exposure section of the film, the film being so mounted relative to its covering strip that the film is in juxtaposition to the slit of the covering strip, and a film engaging element adapted to have a portion thereof exposed through the slits of the covering strip and other portions thereof adapted to extend from the slits of the photographic film strip respectively.

5. A film cartridge embodying a covering strip provided with arcuate slits arranged at intervals throughout the length thereof, a photographic film carried by said covering strip and provided with slits arranged at predetermined intervals throughout the length thereof, a film engaging element for each group of slits of the backing strip and film strip, said element having means to secure the same to the backing strip and having a portion thereof passed through the slits of the film to be secured to the sensitized face thereof.

6. A film cartridge embodying a covering strip provided with a series of slits in the form of ogee curves arranged at intervals throughout the length thereof, a photographic film strip having a plurality of curved slits at intervals throughout the length thereof to be placed in juxtaposition to the ogee curves of the backing strip, and a film engaging element having adhesive surfaces which are designed to be passed through the various slits of the backing strip and film strip when the exposures are to be made on the film strip, and to be thereafter secured respectively to the film strip and backing strip for retaining such strips into engagement with each other.

In testimony whereof, I affix my signature, in presence of two witnesses.

HARRISON GINDELE.

Witnesses:
MAX GINDELE,
E. C. BUCHLER.